(12) United States Patent
Nakada et al.

(10) Patent No.: US 11,061,724 B2
(45) Date of Patent: Jul. 13, 2021

(54) PROGRAMMABLE HARDWARE SCHEDULER FOR DIGITAL PROCESSING SYSTEMS

(71) Applicant: Cavium, LLC, Santa Clara, CA (US)

(72) Inventors: Timothy Toshio Nakada, Santa Clara, CA (US); Jason Daniel Zebchuk, Watertown, MA (US); Gregg Alan Bouchard, Georgetown, TX (US); Tejas Maheshbhai Bhatt, Sunnyvale, CA (US); Hong Jik Kim, San Jose, CA (US); Ahmed Shahid, San Jose, CA (US); Mark Jon Kwong, Santa Clara, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 203 days.

(21) Appl. No.: 15/613,889

(22) Filed: Jun. 5, 2017

(65) Prior Publication Data
US 2018/0349185 A1  Dec. 6, 2018

(51) Int. Cl.
*G06F 9/48* (2006.01)
*G06F 9/50* (2006.01)

(52) U.S. Cl.
CPC ............ *G06F 9/4887* (2013.01); *G06F 9/485* (2013.01); *G06F 9/4881* (2013.01); *G06F 9/5044* (2013.01)

(58) Field of Classification Search
CPC .................................................... G06F 9/4887
See application file for complete search history.

(56) References Cited

U.S. PATENT DOCUMENTS

| 7,340,589 B2 * | 3/2008 | Kudo .................... G06F 9/3016 |
| | | 712/200 |
| 2017/0109172 A1 * | 4/2017 | Sleiman ................ G06F 9/3838 |

OTHER PUBLICATIONS

Patterson et al., Computer Organization and Design, 2005 (Year: 2005).*
Interfacing with the IDT TeraSync FIFO, 2002 (Year: 2002).*
EE 457 Lab 2—FIFO, USC (Year: 2015).*

* cited by examiner

*Primary Examiner* — Charlie Sun
(74) *Attorney, Agent, or Firm* — pkalousek.ip

(57) ABSTRACT

Method and system embodying the method for programmable scheduling encompassing: enqueueing at least one command into one of a plurality of queues having a plurality of entries; determining a category of the command at the head entry of each of the plurality of queues; processing each determined non-job category command by a non-job command arbitrator; and processing each determined job category command by a job arbitrator and assignor, is disclosed.

28 Claims, 10 Drawing Sheets

| Variable | Value | Thermometer representation | Modified thermometer representation |
|---|---|---|---|
| A | 4 | 00001000 | 1000 |
| B | 0 | 00000000 | 0000 |
| C | 1 | 00000001 | 0001 |
| D | 6 | 00100000 | 1010 |
| E | 2 | 00000010 | 0010 |
| F | 3 | 00000100 | 0100 |

FIG. 6

PROGRAMMABLE HARDWARE SCHEDULER FOR DIGITAL PROCESSING SYSTEMS

BACKGROUND

1. Field

The present disclosure relates to digital processing systems. More particularly, this invention is directed toward a programmable hardware scheduler for digital processing systems.

2. Description of Related Technology

Digital processing systems are systems that manipulate data in the form of a discrete, discontinuous sequence of numbers or symbols to permit the digital processing of the data. Such data may represent any type of information, e.g., text, images, signals, or any other type of information known to a person of ordinary skill in the art.

Recent increases in the complexity of digital data processing algorithms have resulted in significant technological innovations. Such innovations include the use of configurable environments and software defined algorithmic processors to adapt to ever evolving algorithms and standards, and the use of multiple processing devices to satisfy the large processing requirements. These innovations increase the demands on the design of a modern digital processing system.

An example of such complex digital data processing algorithms comprises baseband processing in wireless communications, i.e., processing related to the radio control functions, such as: signal generation, modulation, encoding, as well as frequency shifting, transmission of signals, and other radio control functions known to a person of ordinary skills in the art. Consequently baseband processing in wireless communications will be used as a template for explaining the concepts of this disclosure.

A baseband processor may comprise a plurality of engines, such as digital signal processors (DSP) and hardware accelerators, which must work in a coordinated fashion. A digital signal processor (DSP) comprises a software controlled processor or multi-processor unit, an architecture and instruction set of which is optimized for the operational needs of numerical manipulation of signals represented by digital data. A hardware accelerator comprises a firmware controlled hardware device or a pure hardware device, i.e., a device not requiring any firmware. As well known to a person of ordinary skill in the art, firmware is a type of software that provides control, monitoring and data manipulation of a hardware entity that executes the firmware. The firmware is not meant to be changed to alter functionality of the hardware entity. The reasons for changing firmware include fixing bugs or adding features to the function of the hardware entity.

There may be a plurality of requestors presenting jobs, i.e., specific tasks to be performed by an engine, to be accomplished, a limited number of engines to process the jobs, and complex relationship among the jobs. By means of an example, jobs carried out by a given engine might depend on the output of other engine(s) or on external events. There may be a plurality of jobs that need to run on a single engine, and the jobs need to be scheduled among the engines in an efficient order. The jobs must be scheduled to adhere to strict timelines defined by the wireless protocol(s) standard(s). In addition, a flexible solution is needed, to allow customer specific algorithms and to support evolving wireless standards and protocols.

To provide such flexible solutions schedulers receiving job requests from a plurality of requestors, arbitrating among the requests to select a job and distributing the selected job among the plurality of engines have been implemented in software, running on a dedicated DSP or central processor unit (CPU). Traditionally, the term CPU refers to a processor, more specifically to its processing unit and control unit (CU), distinguishing these core elements of a computer from external components such as main memory and I/O circuitry. A processor is the electronic circuitry within a computer that carries out the instructions of a computer program by performing the basic arithmetic, logical, control and input/output (I/O) operations specified by the instructions. Such a software solution offers flexibility, but can consume a lot of power, memory, and hardware resources, while requiring more development time. In addition, CPUs often have slow responses to interrupts and triggers caused by external events, which reduces the overall baseband processing rate.

Accordingly, there is a need in the art for a method and an apparatus implementing a method for programmable job scheduling for digital signal processing, as well as additional advantages.

SUMMARY

In an aspect of the disclosure, an apparatus implementing a method for programmable job scheduling according to appended independent claims is disclosed. Additional aspects are disclosed in the dependent claims.

BRIEF DESCRIPTION OF THE DRAWINGS

The foregoing aspects described herein will become more readily apparent by reference to the following descriptions when taken in conjunction with the accompanying drawings wherein:

FIG. 6. depicts a thermometer representation and a modified thermometer representation of variables and variables' values in accordance with aspects of this disclosure.

Figure 1:
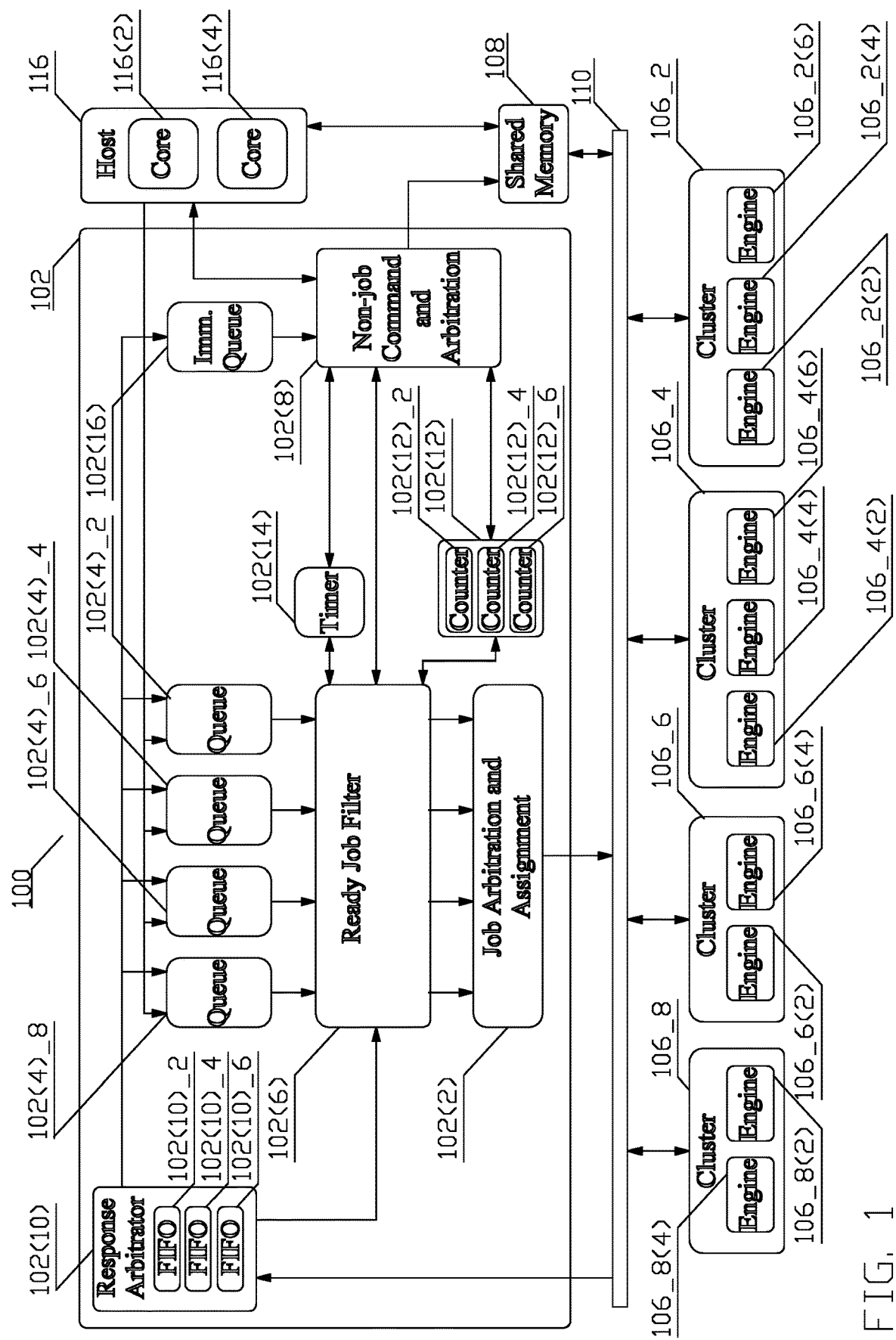
FIG. 1 depicts a conceptual structure 100 of a system enabling programmable job scheduling in accordance with aspects of this invention.
Figure 2A:
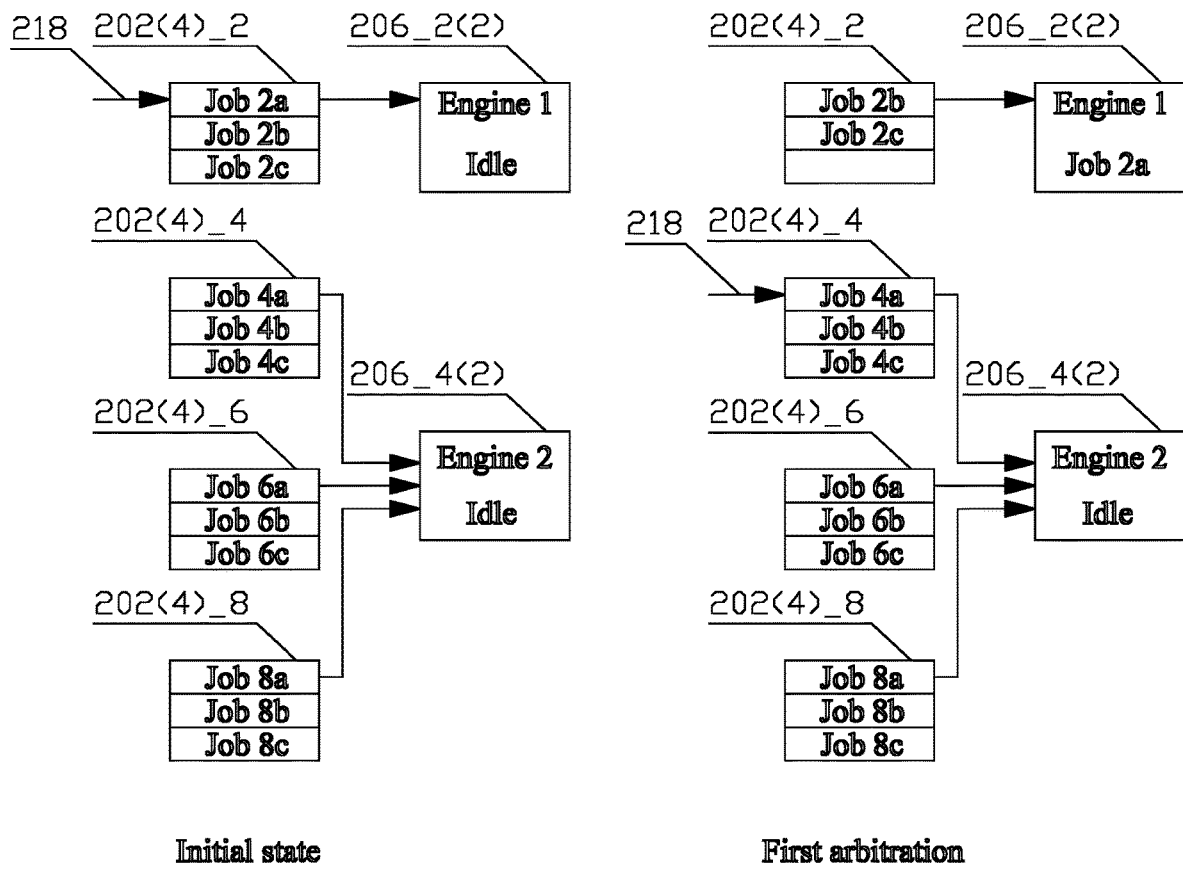
FIG. 2*a* depicts a first part of an exemplary configuration demonstrating standard round-robin arbitration known in the art.
Figure 2B:
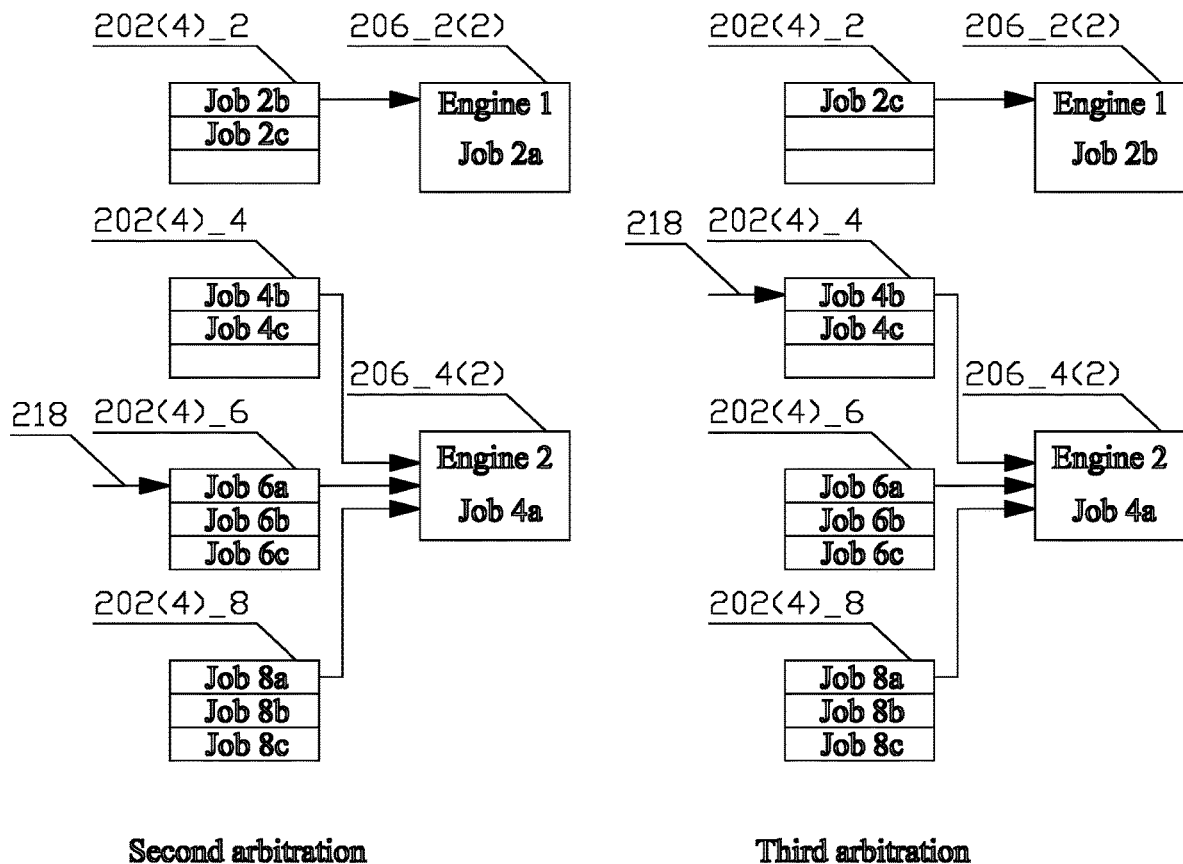
FIG. 2*b* depicts a second part of an exemplary configuration demonstrating standard round-robin arbitration known in the art.
Figure 3A:
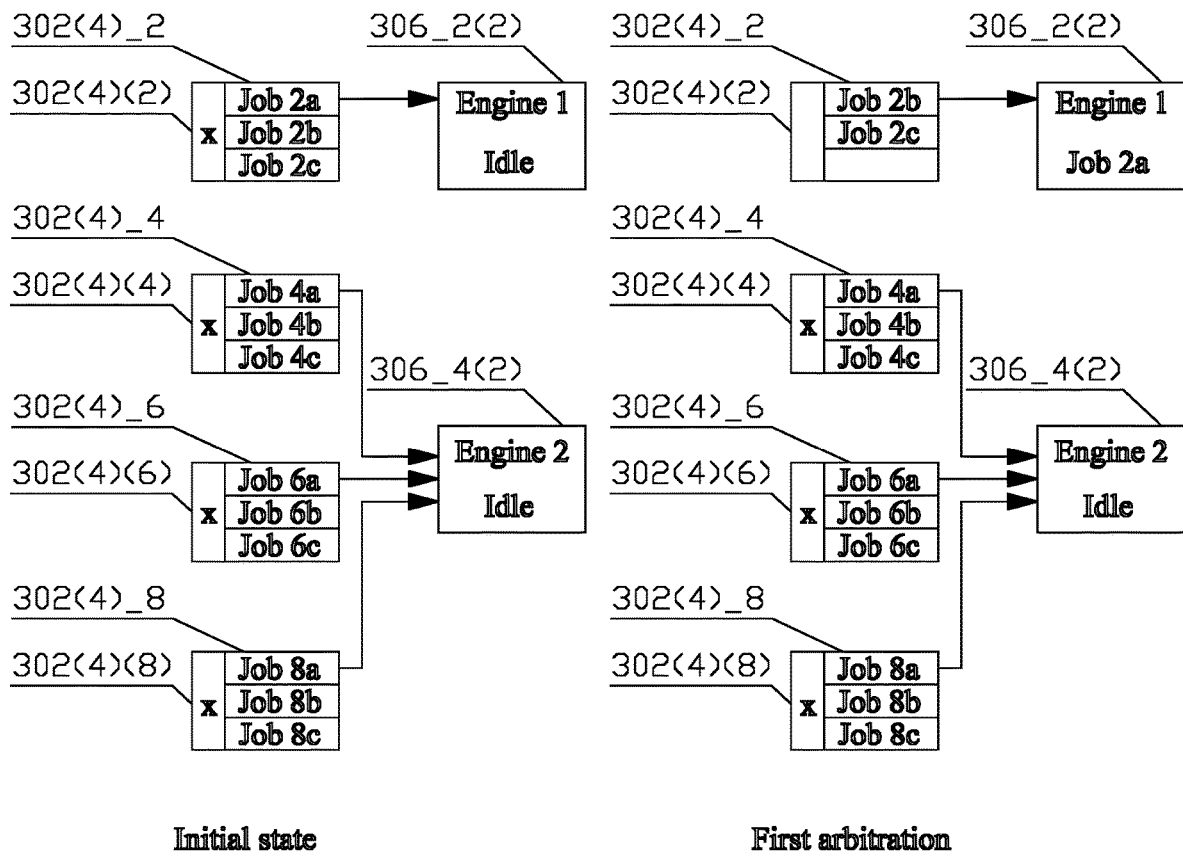
FIG. 3*a* depicts a first part of an exemplary configuration demonstrating modified round-robin arbitration in accordance with aspects of this invention.
Figure 3B:
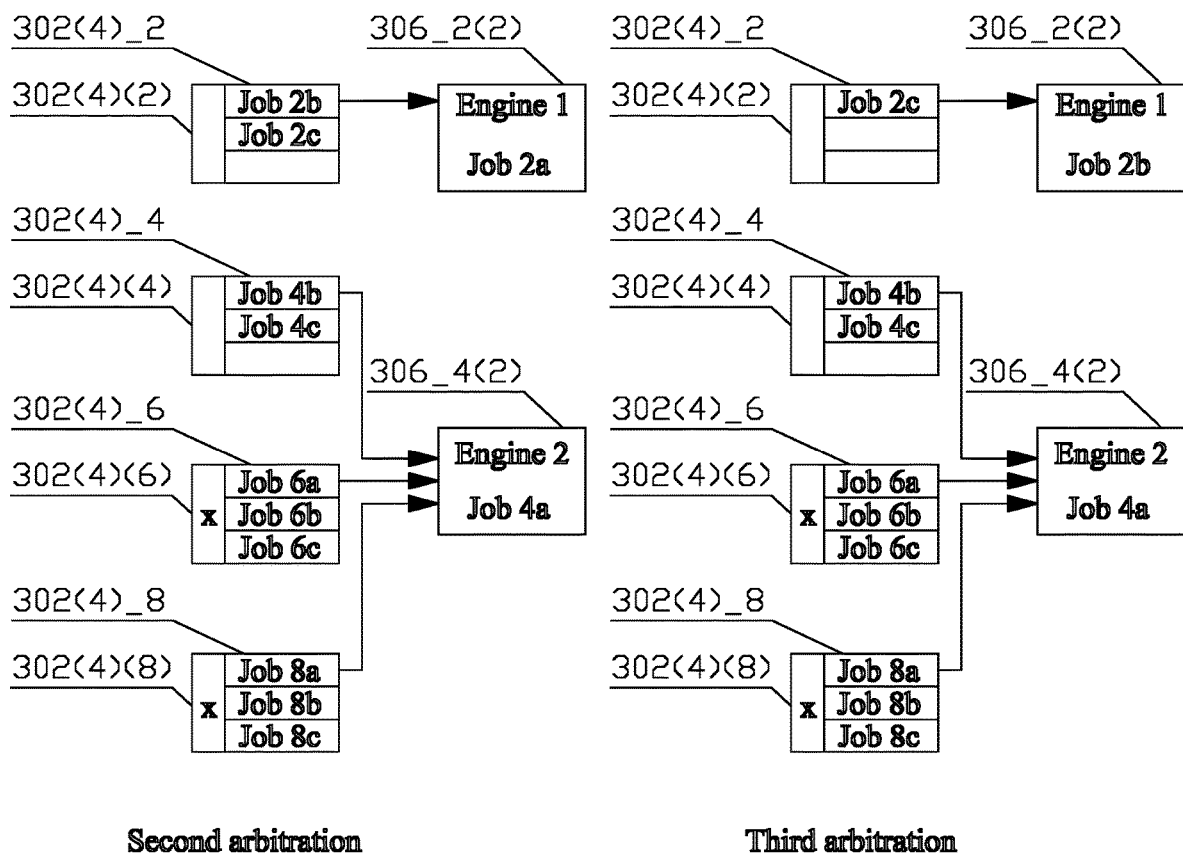
FIG. 3*b* depicts a second part of the exemplary configuration demonstrating modified round-robin arbitration in accordance with aspects of this invention.
Figure 3C:
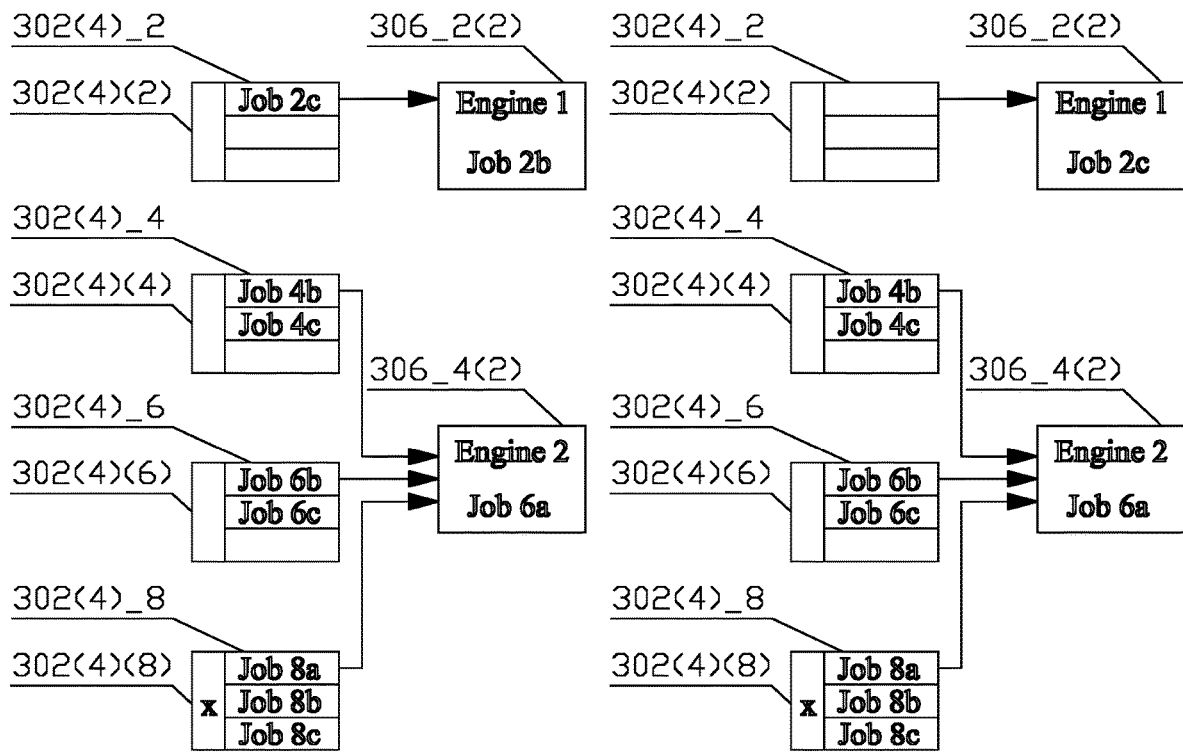
FIG. 3*c* depicts a third part of the exemplary configuration demonstrating modified round-robin arbitration in accordance with aspects of this invention.
Figure 3D:
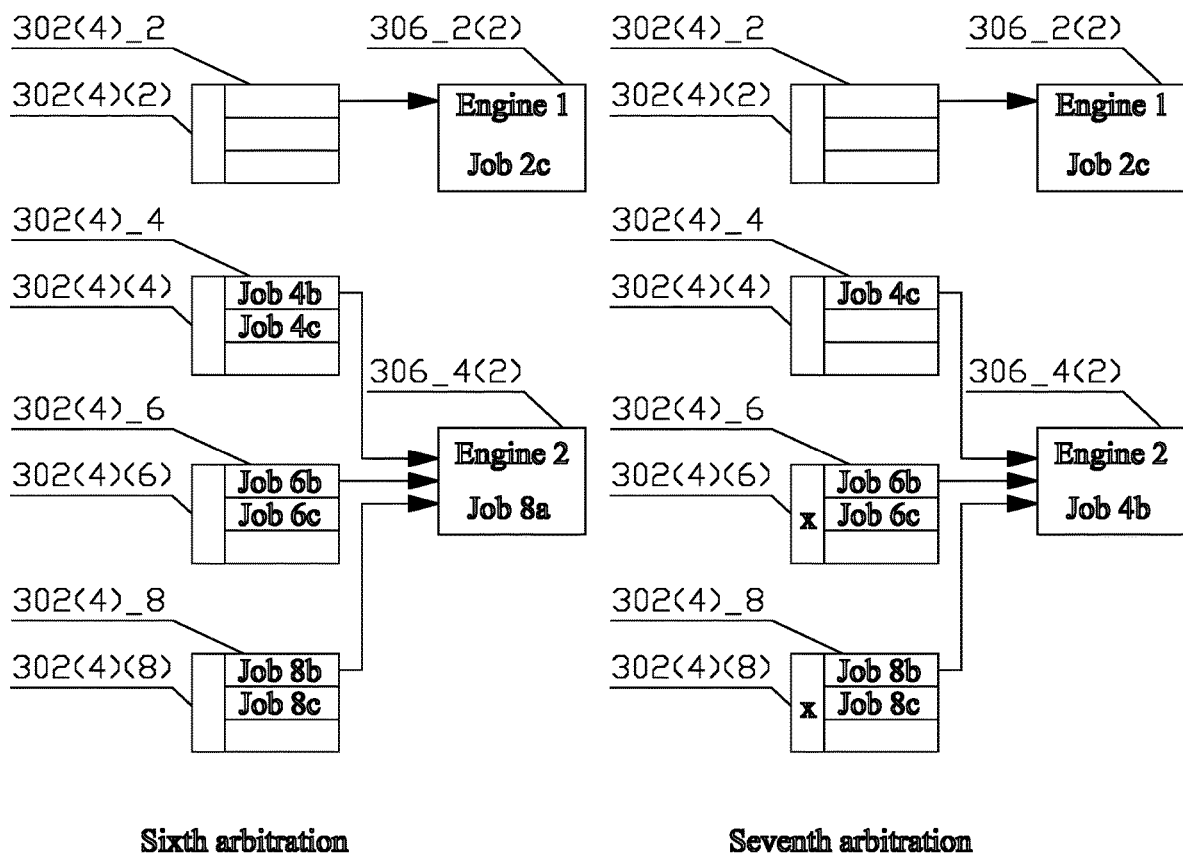
FIG. 3*d* depicts a fourth part of the exemplary configuration demonstrating modified round-robin arbitration in accordance with aspects of this invention.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. In the drawings, an expression "_X" in a reference indicates an instance of an element, while an expression "(X)" indicates a sub-block in a drawing where helpful for better understanding. Any unreferenced single and/or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects presented throughout this disclosure will be readily apparent to a person having ordinary skill in the art, and the concepts disclosed herein may be extended to other applications.

FIG. 1 depicts a conceptual structure of a system 100 enabling programmable job scheduling in accordance with aspects of this invention. The system 100 may be embodied as an assembly of one or more integrated circuits. The depicted blocks and modules of the system 100 may comprise pure hardware entities, and/or hardware entities supporting execution of a firmware and/or hardware entities supporting execution of software. A programmable scheduler module 102 may thus comprise a hardware entity that is programmed by control software executing on one or more cores 116(X) of a host 116, i.e., a controlling entity comprising a firmware or a software controlled hardware device.

The programmable scheduler module 102 selects a job from a plurality of jobs to be accomplished and submits a job command to a resource capable of processing the job. The selection and submission comprise management of, e.g., the timing of job submission, control flow between jobs, job status logging, determination of a resource capable of processing the job, and various other support functions known to a person of ordinary skill in the art. A job is represented by a job command, describing a specific task to be performed by a resource. Based on the representation, the terms job and job command may be used interchangeably, unless a distinction is explicitly noted. The job command may comprise a pointer to an initial memory address in the shared memory 108 where the entire job descriptor, e.g., a job identifier, a description of the processing to be performed, a description of the input data for the job, a description of the output data to be produced by the job, and/or any other information relevant to the job as known to a person of ordinary skill in the art, resides.

In another aspect, the job command may comprise the entire job descriptor, thus no access to the shared memory 108 is required. A shared memory comprises a memory that may be shared by a plurality of resources.

A resource 106_X(X) ultimately responsible for processing a job comprises a structure comprising one or more digital signal processors (DSPs) and/or hardware accelerators (not shown). As known to a person of ordinary skill in the art, a hardware accelerator comprises a firmware controlled hardware device or a pure hardware device, i.e., a device not requiring any firmware, designed to perform at least one pre-determined data processing function, e.g., Viterbi decoding, Fast Fourier Transform, or other functions known to a person of ordinary skill in the art. When the resource 106_X(X) comprises more than one digital signal processor and/or hardware accelerator, the plurality of digital signal processors and/or hardware accelerators may be organized into a resource 106_X(X) that further comprises a job manager (not shown). The job manager coordinates the job for the plurality of the digital signal processors and/or the hardware accelerators comprising the resource 106_X (X), i.e., selects a specific digital signal processor and/or hardware accelerator and administers job descriptors, by directing the job commands to the relevant specific digital signal processor and/or hardware accelerator.

In one aspect, the management of the jobs may be carried as disclosed in co-pending applications entitled METHOD AND APPARATUS FOR JOB PRE-SCHEDULING BY DISTRIBUTED JOB MANAGER IN A DIGITAL MULTI-PROCESSOR SYSTEM, filed on May 5, 2017, application Ser. No. 15/588,240 and METHOD AND APPARATUS FOR PORT MANAGEMENT BY DISTRIBUTED JOB MANAGER IN A DIGITAL MULTI-PROCESSOR SYSTEM, filed on May 5, 2017, application Ser. No. 15/588,015.

An organization of the plurality of digital signal processors and/or hardware accelerators into resources 106_X(X) is solely for the purpose of simplifying the hardware implementation of the system 100 or part thereof. The scheduler module 102 needs to be aware of the structure of the resource(s) 106_X(X) for efficient job arbitration and assignment. The resources 106_X(X) are hereinafter referred to as engines.

The jobs to be scheduled are enqueued by a control software executing on one or more cores 116(X) of the host 116 as job commands into one or more of a plurality of command queues 102(4)_X. Alternatively, the plurality of engines 106_X(X) may generate and cause the response arbitrator 102(10) to enqueue jobs as job commands into one or more of the plurality of command queues 102(4)_X. In addition, the control software or the plurality of engines 106_X(X), via the response arbitrator 102(10), may also enqueue a category of non-job commands into the one or more of a plurality of command queues 102(4)_X. The non-job commands comprise any scheduler 102 commands that do not describe a job, i.e., commands used for control flow, e.g., WAIT command, command(s) manipulating the timer 102(14) and the counters 102(12)_X, command(s) signaling an interrupt to the host 116, command(s) writing status to shared memory 108, command(s) disabling, enabling, and resetting command queue(s) 102(4)_X, e.g., upon detection or clearing of an error, and other commands known to a person of ordinary skill in the art.

Additionally, each command, regardless of whether job or non-job command, may further comprise one or more command parameters, e.g., a job_type parameter, specifying a resource to process the job, a wait_condition parameter selecting a status of a wait condition to be met in order to initiate/end a wait function, and other parameters known to a person of ordinary skill in the art. The wait_function is controlled by the ready job filter 102(6), which upon encountering a command with the wait_condition parameter at the head of a command queue 102(4)_X stalls the command queue 102(4)_X. Upon detecting that the wait condition status has been satisfied, the ready job filter 102(6) unstalls the command queue 102(4)_X, thus enabling the command with the wait_condition parameter to participate in arbitration. The status of the wait condition may comprise, e.g., one or more of a plurality of counters 102(12)_X reaching a specific value, a timer 102(14) reaching a specific value, completing all outstanding jobs specified by the commands preceding the command with the wait_condition parameter, receiving a wait condition status clearing command from an external source, e.g., the control software, another non-stalled command queue 102(4)_X, or an immediate command queue 102(16), and other wait condition statuses known to a person of ordinary skill in the art.

In addition to a command with a wait_condition, the wait function may also be accomplished by the above-mentioned non-job WAIT command. Unlike a command with a wait_condition parameter, the wait condition status is not defined by an optional parameter, but by a field of the WAIT command structure; furthermore, the wait condition status may include statuses not available for the statuses given by the wait_condition parameter. By means of an example, an implementation of the command with the wait_condition parameter may not have size sufficient to specify certain wait condition statuses, e.g., the timer value that needs to be matched. Like any command with a wait_condition parameter, the WAIT command's function is controlled by the ready job filter 102(6). However, upon the status of the wait condition being reached, the ready job filter 102(6) unstalls the command queue 102(4)_X, thus enabling the command enqueued immediately after the WAIT command to become eligible for arbitration.

Based on the foregoing, a person of ordinary skill in the art recognizes that the command with a wait-condition parameter, and the WAIT command are interchangeable, except of cases that a certain wait_condition status may not be available. Thus the use of WAIT command in this disclosure is not limiting.

To prevent non-job commands and job commands not in condition for processing to be considered by a job arbitrator and assignor 102(2), a ready job filter 102(6) determines whether command(s) is/are non-job commands or job commands by examining the head, i.e., the top entry, of the plurality of command queues 102(4)_X. The ready job filter 102(6) provides the non-job command(s) into a non-job command arbitrator 102(8), and determines for each of the job commands whether the job command is in condition for processing, i.e., whether a resource capable of processing the scheduled job command is available. When the determination is positive, the ready job filter 102(6) submits the job command to the job arbitrator and assignor 102(2); when the determination is negative, the ready job filter 102(6) waits for a job command to become in condition for processing.

The job arbitrator and assignor 102(2) designates the requestors, jobs of which were submitted, and arbitrates among the job(s) to select one of the job(s), and assigns, i.e., selects one of the plurality of engines 106_X(X) capable of processing the selected job, and submits the selected job to be executed on the selected engine 106_X(X).

When the selected job is submitted to the one of the plurality of engines 106_X(X), the respective engine 106_X(X) executes the job command by carrying out the actions described therein. Such actions may comprise e.g., accessing the shared memory 108 to retrieve the entire job command descriptor, reading input data for the job, processing the input data, writing output data produced by the job, and other actions known to a person of ordinary skill in that art. Upon finishing the job command processing, the respective engine 106_X(X) may submit additional job commands, non-job commands, and/or job completion messages to the engine response arbitrator 102(10). The engine response arbitrator 102(10) comprises one first-in, first-out (FIFO) buffer 102(10)_X for each engine 106_X(X). The non-job commands that are identified by an immediate queue identifier, are provided by the engine response arbitrator 102(10) into a dedicated immediate command queue 102(16). Job commands, the non-job WAIT command, and any commands with wait_condition parameters are not permitted into the immediate command queue 102(16). Since job commands, the non-job WAIT command, and commands with wait_condition parameters may complete slower relative to non-job commands, avoiding the job commands, the non-job WAIT command, and the commands with wait_condition parameters allows the non-job commands in the immediate command queue 102(16) to execute quickly. Additionally, precluding job commands, the non-job WAIT command, and commands with a wait_condition parameter from the immediate command queue 102(16) can avoid some deadlock situations, i.e., inability of command queues 102(4)_X to make forward progress. Because the job command completion signaling is performed over the same bus 110 that the command queues 102(4)_X use to submit job commands to the engines 106_X(X), the job command completion messages could be blocked by pending job command submissions, if they were permitted from the immediate command queue 102(16). Other commands that are identified by a queue identifier are provided to the command queue 102(4)_X specified by the queue identifier by the engine response arbitrator 102(10). Such other commands may comprise commands from both non-job command and job command categories. The non-job arbitrator 102(8) arbitrates among non-job commands from the immediate queue 102(16) as well as from the command queues 102(4)_X, via the ready job filter 102(6), with priority given to the immediate queue 102(16). Although only a single immediate command queue 102(16) is depicted, other configurations with a plurality of immediate command queues 102(16) are contemplated, wherein the number of the immediate command queues 102(16) as well as the size of each of the immediate command queues 102(16) is configurable by the control software.

The above-disclosed architecture of the programmable scheduler module 102 enables an efficient manner of dynamic job queuing, wherein once the control software or alternatively the plurality of engines 106_X(X) initially programs the plurality of queues 102(4)_X of the programmable scheduler module 102 with job and control commands, the job and control commands then run without any further software action in accordance with timing signals provided by a timer 102(14) and/or counters 102(12)_X.

By means of an example, consider a processing of a sequence of jobs, wherein one job, i.e., job 2, requires as an input data resulting from a previous job, i.e., job 1. A programmable scheduler module 102 control software writes the job 1 job command, followed by a WAIT command, a wait condition status of which is the criterion of having completed all outstanding jobs issued from this queue, followed by the job 2 job command to one of the plurality of queues 102(4)_X. The commands are then executed sequentially, with the scheduler 102 ensuring that job 2 will not begin until job 1 completes, without any further control software intervention.

In addition, since a plurality of command queues 102(4)_X are supported, and are managed in parallel by the hardware implementing the scheduler module 102, processing of parallel flows without the control software overhead is achieved. To allow flexible and efficient use of the scheduler's 102 memory (not shown) from which the command queues 102(4)_X are assigned, both the number of the plurality of command queues 102(4)_X and the size of each of the plurality of command queues 102(4)_X is configurable by the control software.

In contrast to the above-disclosed software programmable hardware based solution, a purely software based solution would require monitoring each engine 106_X(X), and submitting the subsequent jobs as the prior job completes. Such a monitoring could be implemented by e.g., polling, which would increase the load on the hardware executing the software. Alternatively, the monitoring could also be implemented by means of interrupts, which would increase the job submission latency time. Implementation of either method would also become more complex in trying to service multiple processing flows in parallel.

As disclosed supra, the engines 106_X(X) comprise a structure comprising one or more of a digital signal processors (DSPs) and/or a hardware accelerators (HAs) that may be optimized to process limited number of job types, e.g., decoding, soft combining, Fast Fourier Transform, and other types of jobs known to a person of ordinary skill in the art. To accomplish processing of the different job types, programmable vectors are defined by the control software and stored in the ready job filter 102(6). Each of the programmable vectors defines a job type and the contents of each programmable vector represents the engine(s) 106_X(X) that is/are capable of processing the job type. The programmable vectors result in independence of the scheduler design from the system 100 design, which the scheduler manages.

If the type of DSPs/HAs and/or the organization of the DSPs/HAs into engines 106_X(X) is different for different system 100 designs, identical schedulers may be used and the control software may redefine the programmable vectors to virtually rearrange the DSPs/HAs. Furthermore, since engines 106_X(X) comprising DSPs can be repurposed by different programs for different types of jobs, the control software can program the content of the vectors, defining engines 106_X(X) capable of processing the job type.

The engines response arbitrator 102(10) monitors job completion events, and forwards the job completion events to the ready job filter 102(6) that keeps track of the state of each of the plurality of the engines 106_X(X). The job completion accounting is carried out in parallel for each job type that engine 106_X(X) may perform, thus providing a status for each job type. Consequently, the job arbitration and assignment 102(2) is able to find the engine(s) 106_X (X) capable of processing all the potential job types awaiting processing, and arbitrate amongst them.

By means of an arbitration example, consider that job type 1 processing is required. Since the engine response arbitrator 102(10) monitors job completion events and the ready job filter 102(6) keeps track of the state of each of the plurality of the engines 106_X(X), the ready job filter 102(6) identifies the engines 106_6(2)-106_8(2) that may perform the job type 1 as disclosed supra. When at least one of the engines 106_6(2)-106_8(2) is idle, the programmable scheduler module 102 may schedule the job for processing. When, on the other hand, all the engines 106_6(2)-106_8(2) are processing jobs, upon the engines response arbitrator 102 (10) determining completion of a job by at least one of the engines 106_6(2)-106_8(2), the engines response arbitrator 102(10) informs the programmable scheduler module 102 that may then schedule the job for processing without any software intervention.

In contrast to the above-disclosed software programmable hardware based solution, a purely software based solution would require the hardware executing the software to keep track of the status of the engines by receiving interrupts when the engines complete the work. The software would then need to determine whether the interrupting engine(s) were capable of executing the next job or not. In other words, an interrupt from an engine generating the interrupt would need to be serviced to determine whether the engine can execute the specific job type of the subsequent job. Since interrupt handling can be quite slow, the purely software based solution would increase the latency of job submissions.

Alternatively, the purely software based solution could, e.g., poll the engines; however, such polling consumes power and cycles of the hardware executing the software, and might also suffer from slower response times when a plurality of engines need to be monitored in parallel.

The job arbitrator and assignor 102(2) needs to employ an arbitration method. Many arbitration methods, e.g., round-robin, try to service requests fairly, so that the requests are granted in a balanced fashion. Round-robin maintains a dynamic priority vector, such that the last winning service requestor will have the lowest priority for the next round of arbitration. However, the service requestor can participate in the arbitration only upon having an active request, i.e., when the requestor has jobs to be processed, and a resource is available to be provided to the requestor. Thus, the requests may be withdrawn if the required resource becomes unavailable. Furthermore, arbitration for many different resources with highly variable job latencies is done in parallel in the same logic. These factors may result in unfair arbitration using the standard round-robin.

FIG. 2 depicts an exemplary configuration, demonstrating the unfairness of standard round-robin arbitration. In the exemplary configuration, one of the service requestors, represented by the plurality of command queues 202(4)_X, e.g., command queue 202(4)_2, is submitting jobs 2a, 2b, and 2c, requiring a short processing time to one of the resources, represented by the plurality of engines 206_2(X), capable of processing these types of jobs, e.g., to engine 206_2(2), while command queues 202(4)_4-202(4)_8 are submitting jobs 4a, 4b, and 4c, jobs 6a, 6b, and 6c, and jobs 8a, 8b, and 8c, respectively, requiring a long processing time to the engine 206_4(2). Using the standard round-robin as an example, after each arbitration, the priority vector 218 is set to give the lowest priority to the service requestor that just won the arbitration and the highest priority to some other service requestor, e.g., the next service requestor. However, this priority vector setting strategy may result in command queue 202(4)_4 effectively getting higher priority, at the expense of the command queues 202(4)_6 and 202(4)_8.

Specifically, after the first arbitration, the command queue 202(4)_2 submitted the job 2a to the engine 206_2(2); consequently, the priority vector 218 is set to give the command queue 202(4)_4 the highest priority.

After the second arbitration, the command queue 202(4)_4 has submitted the job 4a to the engine 206_4(2). The priority vector 218 is then set to give the command queue 202(4)_6 the highest priority. However, should the job 2a from the command queue 202(4)_2 complete, the engine 206_2(2) would be ready to accept another job. Since the service requestor 202(4)_2 is the only command queue with an active request, the priority vector 218 is set to give the service requestor 202(4)_2 the highest priority in order to avoid stalling the job processing for the service requestor 202(4)_2.

After the third arbitration, command queue 202(4)_2 submits the job 2b to the engine 206_2(2); this action sets the priority vector 218; therefore, the command queue 202(4)_4 has highest priority again. Even though command queues 202(4)_6 and 202(4)_8 have not yet submitted any jobs, the command queue 202(4)_4 would win the next arbitration among the service requestors 202(4)_4-202(4)_8 and would submit a job to the engine 206_4(2).

To mitigate the arbitration unfairness, the standard round-robin is modified to give higher priority to the service requestors, the requests of which have not been granted within the current arbitration round. Each service requestor is associated with an un-served status indicator. The un-served status indicators for all the service requestors are set by the job arbitrator and assignor 102(2) upon initial job assignments to the service requestors. The status of the service requestors are tracked by the job arbitrator and assignor 102(2) that records the un-served status indicators of requestors and determines one of the un-served service requestors request to be granted. Such determination may be carried out according to a pre-determined policy, e.g., a random selection, round-robin selection, selection of the lowest numbered service requestor, or any other selection method known to one skilled in the art. The job arbitrator and assignor 102(2) submits the request from and clears the un-served status indicator of the determined service requestor. When only service requestor(s) with active request(s) has/have been served, and thus has/have the un-served status indicator(s) cleared, then the un-served status indicators are reset for any such service requestors; consequently, all the service requestors are able to participate in arbitration again.

FIG. 3 depicts an exemplary configuration demonstrating modified round-robin arbitration in accordance with aspects of this invention. In FIG. 3, the plurality of service requestors 302(4)_2-302(4)_8 may represent the plurality of command queues 102(4)_X; the arbitrator (not shown in FIG. 3) may represent the job arbitrator and assignor (102(2)), and the resources 306_2(2) and 306_4(2) may represent the engines 106_2(2) and 106_4(2) of the conceptual structure 100 of the system depicted in FIG. 1.

Upon initial job assignments to command queues 302(4)_2-302(4)_8, status indicators 302(4)(2)-302(4)(8) of un-served status are set by the job arbitrator and assignor (102(2)) because none of the command queues' 302(4)_2-302(4)_8 requests have been served. All the command queues 302(4)_2-302(4)_8 have active requests. The job arbitrator and assignor (102(2)) selects one of the command queues 302(4)_2-302(4)_8 according to a pre-determined policy. Such a policy may comprise e.g., round-robin, selecting the lowest numbered queue or any other policy known to a person of ordinary skill in the art. For the purposes of explanation, without any loss of generality, the lowest numbered queue policy is assumed.

At the first arbitration, the job arbitrator and assignor (102(2)) selects the command queue 302(4)_2, which submits a job 2a to the engine 306_2(2); consequently, the un-served status indicator 302(4)(2) is cleared.

At the second arbitration, the command queues 302(4)_4-302(4)_8 have active requests, and the job arbitrator and assignor (102(2)) selects the command queue 302(4)_4, which submits a job 4a to the engine 306_4(2); consequently, the un-served status indicator 302(4)(4) is cleared.

After the job 2a from the command queue 302(4)_2 has completed, the engine 306_2(2) is ready to accept another job. The command queue 302(4)_2 has an active request, but has the un-served status indicators 302(4)(2) cleared. Since the only command queue with an active request is the command queue 302(4)_2, which has its un-served status indicator cleared, and since the command queue 302(4)_2 is the only queue that can participate in arbitration, the un-served status indicator 302(4)(2) is set. This action does not affect the un-served status indicators 302(4)(4)-302(4)(8) of the command queues 302(4)_4-302(4)_8 since the engine 306_4(2) is still processing the job 4a from command queue 302(4)_4; thus none of the queues 302(4)_4-302(4)_8 have an active request and, consequently, none are eligible to participate in the arbitration. Therefore, at the third arbitration, the job arbitrator and assignor (102(2)) selects the command queue 302(4)_2, which submits a job 2b to the engine 306_2(2) and clears the un-served status indicator 302(4)(2).

After the job 4a from the command queue 302(4)_4 has completed, the engine 306_4(2) is ready to accept another job. All the command queues 302(4)_4-302(4)_8 have active requests, but the command queue 302(4)_4 has the un-served status indicator 302(4)(4) cleared. Since there are un-served queues 302(4)_6 and 302(4)_8 with active requests, the un-served status indicator 302(4)(4) is left cleared, and the command queue 302(4)_4 is ineligible to participate in the arbitration. Therefore, the job arbitrator and assignor 102(2) ascertains in accordance with the state of the indicators 302(4)(6)-302(4)(8) that command queues 302(4)_6-302(4)_8 have not been served; consequently, the job arbitrator and assignor (102(2)) selects in the fourth arbitration a job from one of the command queues 302(4)_6-302(4)_8, e.g., job 6a from the command queue 302(4)_6 in accordance with the pre-determined policy and the un-served indicator 302(4)(6) is cleared.

After the job 2b from the command queue 302(4)_2 has completed, the engine 306_2(2) is ready to accept another job; consequently, the command queue 302(4)_2 has an active request, but has the un-served status indicator 302(4) (2) cleared. Since the only command queue with an active request is the command queue 302(4)_2 which has its un-served status indicator cleared, and since the command queue 302(4)_2 is the only queue that can participate in arbitration, the un-served status indicator 302(4)(2) is set. This action does not affect the indicators 302(4)(4)-302(4) (8) of the command queues 302(4)_4-302(4)_8 since the engine 306_4(2) is still processing the job 6a from queue 302(4)_6; thus, none of the queues 302(4)_4-302(4)_8 have an active request, and, consequently, are ineligible to participate in the arbitration. Consequently at the fifth arbitration, the job arbitrator and assignor (102(2)) selects the command queue 302(4)_2, which submits a job 2c to the engine 306_2(2) and clears the un-served status indicator 302(4)(2).

After the job 6a from the command queue 302(4)_6 has completed, the engine 306_4(2) is ready to accept another job. All the command queues 302(4)_4-302(4)_8 have active requests, but the command queues 302(4)_4 and 302(4)_6 have the un-served status indicators 302(4)(4) and 302(4)(6) cleared. Since the served command queues 302 (4)_4 and 302(4)(6) are not the only command queues with an active request, the un-served status indicators 302(4)(4) and 302(4)(6) are left cleared, and the command queues 302(4)_4 and 302(4)_6 are ineligible to participate in the arbitration. Therefore, the job arbitrator and assignor (102 (2)) ascertains in accordance with the state of the indicators 302(4)(4)-302(4)(8) that the command queue 302(4)_8 has not been served; consequently, the job arbitrator and assignor (102(2)) selects in the sixth arbitration a job 8a from the command queue 302(4)_8 and the un-served indicator 302(4)(8) is cleared.

Upon completion of the current job 8a by the engine 306_4(2), all the command queues 302(4)_4-302(4)_8 will have active requests. However, each of the command queues 302(4)_4-302(4)_8 has its un-served status 302(4)(X) cleared. Thus, there is no active request from an unserved command queue at this time. Therefore, the status indicators 302(4)(4)-302(4)(8) are set, and the command queues 302 (4)_4-302(4)_8 can participate in arbitration again. Consequently, the job arbitrator and assignor (102(2)) selects in the seventh arbitration job 4b from the command queue 302(4) _4 and the un-served indicator 302(4)(4) is cleared Based on the foregoing, the frequent requests from the command queue 302(4)_2 do not affect the arbitration of the command queues 302(4)_4-302(4)_8. Each time the command queue 302(4)_2 has an active request while the command queues 302(4)_-302(4)_8 requests are withdrawn, the un-served status indicator 302(4)(2) of the command queue 302(4)_2 can be individually reset, while the un-served status indicators 302(4)(4)-302(4)(8) for command queues 302(4)_4-302(4)_8 remain unchanged. Thus, the arbitration between command queues 302(4)_4-302(4)_8 submitting jobs requiring a long processing time remains fair.

The plurality of jobs to be executed by the engine(s) 106_X(X) may have a variety of different priority levels. Some jobs might be critical, e.g., due to requirements of the wireless protocol, due to subsequent jobs that depend on the result of another job, and other conditions, known to a person of ordinary skill in the art. Other jobs may be less critical or tentative, i.e., not being strictly mandatory, e.g., determination of an error correction rate, attempt to recover data from a noisy channel, and other jobs known to a person of ordinary skill in the art. To enable job priorities, one or more of the plurality of the command queues 102(4)_X may be programmed with different priority levels by the control software. The programmed priority level for each of the plurality of the command queues 102(4)_X is then considered by the job arbitrator and assignor 102(2) before each round of arbitration, and only the command queues 102(4)_X with the highest priority level participate in the arbitration. The priority level for each job is pre-determined by a designer of the job from a plurality of the priority levels. In one aspect, there are 4 priority levels.

By means of an example, consider two jobs, job 1 and job 2, that can only be processed by a single engine 106_X(X). Furthermore, the engine 106_X(X) is currently processing another job. One of the jobs, e.g., job 1 is critical, while the other job, e.g., job2 is less critical or tentative. The control software enqueues the job 1 to a command queue 102(4)_X that has been configured with the highest priority level, e.g., command queue 102(4)_2, and then the control software examines the priority level of the job 2 and enqueues the job 2 into a command queue 102(4)_X that has been configured with the priority level corresponding to the priority level of the job 2, e.g., command queue 102(4)_6. When the engine 106_X(X) completes the current job, the job arbitrator and assignor 102(2) detects that the two command queues 102 (4)_2 and 102(4)_6 contain jobs for the engine 106_X(X), and selects the job 1 from the highest priority command queue 102(4)_2. When the engine 106_X(X) completes the job 1, then the job 2 will be selected, unless a higher priority job for the engine 106_X(X) has been generated and enqueued in the meanwhile.

Referring back to FIG. 3, the concept of the modified round-robin has been disclosed in terms of the priority level of the command queues 302(4)_2-302(4)_8 being the same without any loss of generality. However, should the different service requestors, e.g., the command queues 302(4)_X, have different priority levels, only the service requestors with the highest priority level that have an active request participate in the arbitration. Thus, as disclosed supra, before each round of arbitration, the job arbitrator and assignor (102(2)) determines a priority level of each of the plurality of the command queues 302(4)_2-302(4)_8 and only those of the command queues 302(4)_2-302(4)_8 with the determined highest priority level participate in the arbitration.

As alluded to above, the processing algorithm, e.g., the wireless protocol, may require complex job dependencies, wherein a job might require an output of jobs from several different engines 106_X(X). By means of an example, job 4 might need the output from jobs 1, 2, and 3.

Since as disclosed supra, after initial programming, the programmable scheduler module 102 works without requiring the control software intervention, the job sequencing is handled by job counter module 102(12). The job counter module 102(12) comprises a plurality of counters 102(12)_X that may be incremented or decremented by the engines 106_X(X), external events, and/or the control software. The control software enqueues commands to the one or more of the plurality of command queues 102(4)_X, and one or more of the plurality of counters 102(12)_X are initialized by either the control software or by the commands that were enqueued. Upon detection of any WAIT command or any command with a wait condition parameter, specifying an expiration of the one or more of the plurality of counters 102(12)_X, at the head of the command queue 102(4)_X, the ready job filter 102(6) stalls the command queue 102(4)_X and monitors the one or more counters 102(12)_X. Upon the one or more counters 102(12)_X reaching the count value(s) specified by the WAIT command or the wait_condition parameter of the command, the ready job filter 102(6) unstalls the command queue 102(4)_X and, if the command at the head of the command queue 102(4)_X comprises a WAIT command, provides the command enqueued immediately after the WAIT command; otherwise provides the command with a wait condition parameter to the job arbitrator and assignor 102(2) or the non-job command arbitrator 102(8) in accordance with the category of the command to be arbitrated and scheduled.

Referring back to the example of job sequencing, the control software initializes one of the plurality of counters 102(12)_X, e.g., counter 102(12)_2 to a value of 3, and enqueues a WAIT command into the command queue 102(4)_X, e.g., command queue 102(4)_2, and subsequently enqueues into the command queue 102(4)_2 the command for job 4. The WAIT command indicates to wait with processing commands in command queue 102(4)_2 until counter 102(12)_2 expires, i.e., reaches 0. Upon completion of each of the jobs 1, 2, and 3, the engine 106_X(X) processing the respective job sends a job completion non-job command targeting the immediate queue 102(16) to the engines response arbitrator 102(10). Each of the job completion non-job commands are provided by the engines response arbitrator 102(10) via the immediate queue 102(16) to the non-job command arbitrator 102(8), which decrements the counter 102(12)_2. Although an engine 106_X(X) capable of processing job 4 may be available, job 4 is blocked by the WAIT command. Only when the counter 102(12)_2 expires, the the ready job filter 102(6) allows the command queue 102(4)_2 to advance, the command for job 4 is arbitrated by the job arbritrator and assignor 102(2) and eventually submitted to an available engine 106_X(X) capable of processing the job.

In addition to the job sequence of dependent jobs disclosed supra, a plurality of such job sequences may be processed in parallel. However, if the control software has written all the dependent jobs of the sequences into the same command queue 102(4)_X, the jobs may not be submitted to the engines 106_X(X) capable of processing the jobs in the most optimal fashion, due to head-of-line blocking.

Figure 4A:
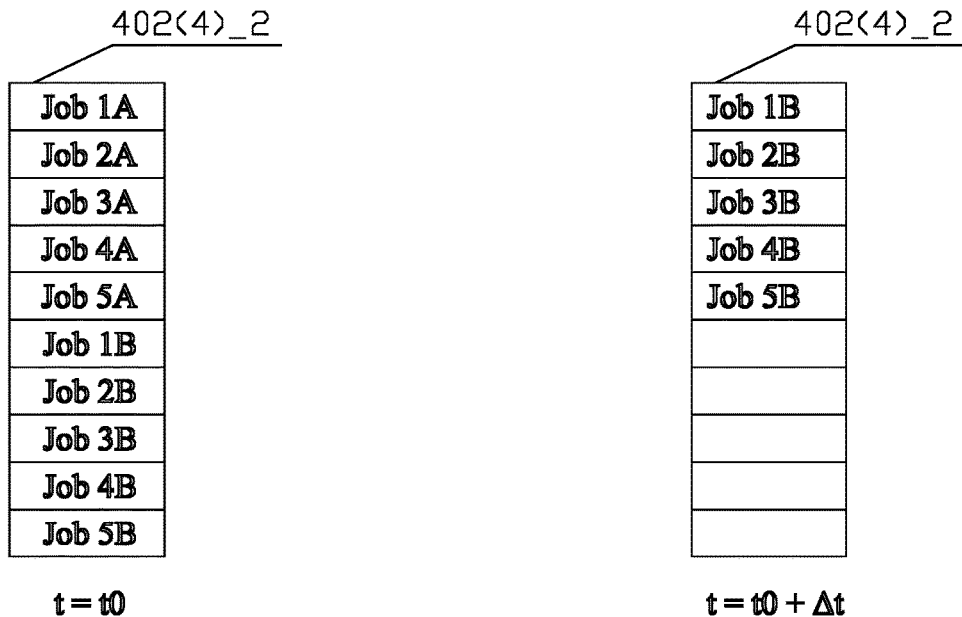
FIG. 4*a* depicts an initial state of a command queue 402(4)_2 and the state of the command queue 402(4)_2 at a later time demonstrating a head-of-line blocking problem known in the art.

By means of an example, refer to FIG. 4a, depicting an initial state of a command queue 402(4)_X, e.g., the command queue 402(4)_2, as enqueued by the control software at time t=t$_0$. The enqueued jobs comprise a plurality of five job sequences, each sequence comprising two jobs, job A and job B, and in each sequence, job B cannot begin until job A has completed.

Time t=t$_0$+Δt depicts state of the command queue 402(4)_2 when all the jobs A for all the sequences have been submitted for processing; however, job 1A is still being processed by one of the engines 106_X(X). Job 1B has advanced to the head of the command queue 402(4)_2; however, job 1B may not be processed because of job's 1B dependency on job 1A, which is still being processed. Meanwhile, if job 2A processing has been completed, job 2B is ready for processing, but job 2B cannot be submitted for processing, because job 1B is blocking the head-of-line of the command queue 402(4)_2. A naïve approach to the head-of-line blocking problem could be to allocate a different command queue 402(4)_2 for each job sequence; however, there might not be enough queues.

The architecture of the programmable scheduler module 102 enables job chaining, wherein the engine 106_X(X) processing a job may cause the response arbitrator 102(10) to enqueue other job(s) upon completing the currently processed job via the engine response arbitrator 102(10) as disclosed supra. Accordingly, in one aspect, for each of the plurality of sequences, the control software appends the job command(s) of the dependent job(s) to the independent jobs' job commands, and enqueues only the independent jobs into one of the plurality of the command queues 102(4)_X. Upon completion of the independent job, the dependent job(s) is/are submitted by the engine 106_X(X) that completed the independent job to the response arbitrator 102(10) that enqueues the dependent job(s) into a different one or more of the plurality of the command queues 102(4)_X.

In another aspect, for each of the plurality of sequences, the control software appends the job command of each subsequent job to the job command of the previous job, and enqueues only the independent job into one of the plurality of the command queues 102(4)_X. Upon completion of the independent job, the first dependent job is enqueued into a different one of the plurality of the command queue(s) 102(4)_X. The process is repeated until all the dependent job(s) have been processed. Therefore, jobs in the sequences are only enqueued when they are in condition to be processed, and do not cause any queue blocking.

Figure 4B:
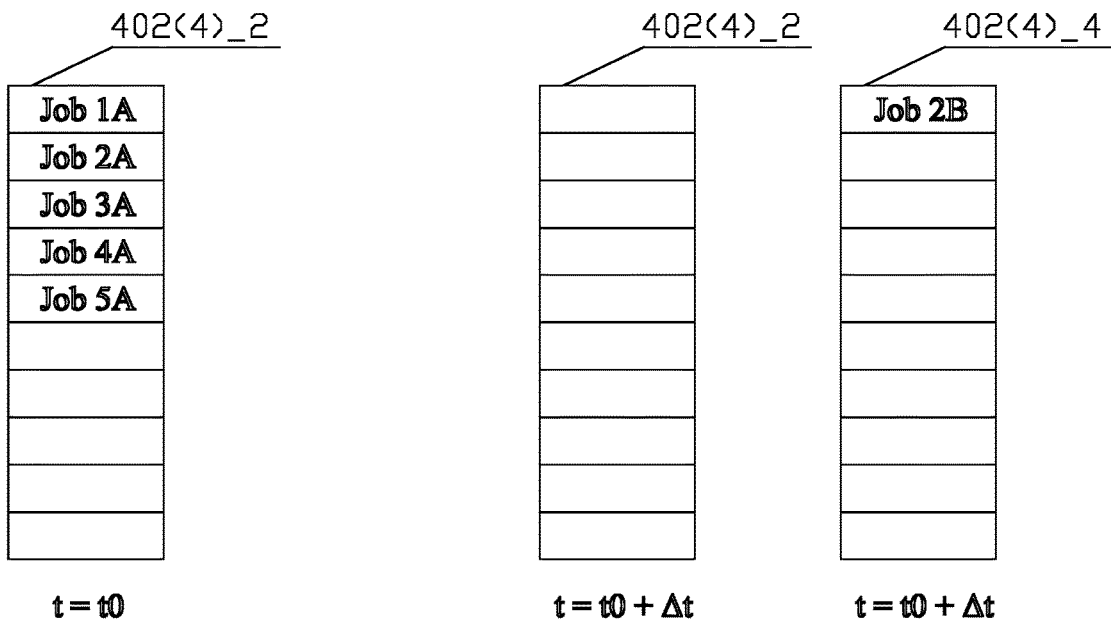
FIG. 4*b* depicts an initial state of a command queue 402(4)_2 and the state of the command queue 402(4)_2 and a command queue 402(4)_4 at a later time in accordance with aspects of this invention.

Referring back to the example disclosed supra, FIG. 4b depicts an initial state of a command queue 402(4)_X, e.g., command queue 402(4)_2, as enqueued by the control software at time t=t$_0$. The enqueued jobs comprise first jobs, i.e., jobs A, of each of the plurality of sequences. The dependent jobs, i.e., jobs B, are not enqueued by the control software, but rather are appended to the jobs' A descriptors as disclosed supra. When the at least one of the engines 106_X(X) completes processing of the job A, the at least one engines 106_X(X) enqueues the dependent job B as depicted in FIG. 4b. Since the dependent jobs are only enqueued when the jobs are in condition to be processed, there is no head-of-line blocking.

Time t=t$_0$+Δt depicts state of the command queue 402(4)_2 when all the jobs A for all the sequences have been submitted for processing and processing of job 2A has completed. The completion of job 2A causes the engine 106_X(X) to enqueue job 2B into a second command queue 402(4)_X, e.g., command queue 402(4)_4; therefore, no other job, e.g., job 1B, will block job 2B.

Although the examples depicted sequences with two jobs only, such a case was only to illustrate the concepts and arbitrarily long sequences are contemplated.

The architecture of the programmable scheduler module 102, further enables job continuation which allows a sequence of jobs to be guaranteed to run on the same engine 106_X(X). By means of an example, an engine 106_2(2) starts processing job 1, using data in a buffer A of the shared memory 108 and producing data that is stored in a buffer B of the shared memory 108. Upon completion of the job 1 processing, the engine 106_4(2) starts processing job 2, using data from the buffer B and producing data that is stored in a buffer C of the shared memory 108. Upon completion of the job 2 processing, the engine 106_2(2) starts processing job 3, using data in the buffer A and the buffer C.

Although scheduling of such jobs' sequence processing could be implemented using the previously disclosed sequencing management, the data in buffer A would have to be transferred for both the job 1 and the job 3 processing. This could consume a significant amount of bandwidth accessing the shared memory 108. Additionally, repeating the data transfers could add significantly to the jobs' processing times and the overall processing throughput.

The job continuation sequence management allows the control software to reserve an engine 106_X(X) for future dependent job(s), allowing state to be preserved during the sequence of jobs, as long as the engine 106_X(X) is capable of processing all the dependent job(s). The dependent job(s) are enqueued in one of the plurality of command queue(s) 102(4)_X. The reservation guarantees that the job arbitrator and assignor 102(2) in cooperation with the ready job filter 102(6) does not submit jobs from other than the command queue 102(4)_X comprising the dependent job(s) to the reserved engine 106_X(X); consequently, the reserved engine 106_X(X) may preserve a state, e.g., the buffer A, intermediate results or pre-loaded software routines, and other attributes of a state known to a person of ordinary skill in the art, for the future dependent job(s). The control software may set the reservation for a single future dependent job or an arbitrarily long sequence of future dependent jobs. Once the last future job has been completed, the reservation is released, which allows any of the command queues 102(4)_X to submit jobs to the engine 106_X(X).

Referring back to the example disclosed supra, the ready job filter 102(6) determines in accordance with the programmable vectors that any of the engines 106_6(2)-106_8(2) is capable of processing job 1 enqueued in a command queue 102(4)_X, e.g., the command queue 102(4)_2. The job arbitrator and assignor 102(2) in cooperation with the ready job filter 102(6) reserves an engine 106_X(X), e.g., the engine 106_6(2), submits the job 1 to the engine 106_6(2), and prevents submission of jobs from other command queues 102(4)_X to the engine 106_6(2). Upon completion of job 1, the job 2 is enqueued by the engine 106_6(2) via the response arbitrator 102(10) using the job chaining sequence mechanism disclosed supra. The engine 106_6(2) remains blocked from accepting jobs from other than the command queue 102(4)_2, and can thus retain the state from job 1 processing, e.g., the buffer A, working data, and other attributes of a state. Upon completion of the job 2, the job 3 for the engine 106_6(2) is enqueued by the engine 106_2(2) via the response arbitrator 102(10) using the job chaining sequence mechanism. Since job 3 is the last job from the sequence, the reservation is released, and other jobs may be submitted to the engine 106_6(2).

In another aspect, instead of using the job chaining mechanism to enqueue the jobs, the control software may enqueue all the jobs, e.g., the jobs 1, 2, and 3 in order into a single one of the command queues 102(4)_X.

The architecture of the programmable scheduler module 102, further enables scheduling jobs at a time of an occurrence of an external event, i.e., event not generated by or intended for the programmable scheduler module 102. Such external event may comprise, e.g., signals from a host 116, expiration of a time interval(s), reaching a specific radio frame number, and other external events known to a person of ordinary skill in the art. Additionally, the scheduling of jobs at specific points in the radio processing timeline, e.g., at or before the start of every sub-frame or frame, may be required.

As disclosed supra, the job counter module 102(12) comprises a plurality of counters 102(12)_X that may be incremented or decremented directly by the external events, without an involvement of the control software running on one or more processor cores 116(X) of a host 116 and/or the engines 106_X(X), as well as by commands enqueued by the control software and/or the engines 106_X(X). via the response arbitrator 102(10), the enqueued commands being generated in response to detection of the external events.

To enable scheduling jobs based on specific time points, job submissions may be dependent on the external events via the counters 102(12)_X or may wait for specific time values from the timer 102(14). Such a scheduling may be achieved by setting parameters for appropriate commands or by using WAIT commands enqueued into a command queue 102(4)_X, as disclosed supra.

By means of an example, the wireless protocol may require that certain jobs to be processed by engines 106_X(X) are provided with current time. Consider that one of the engines 106_X(X) is providing data to be transmitted. Each job might be providing a portion of the data, i.e., one sub-frame, and the sub-frames need to be aligned to a reference time. The job can be scheduled to start at a specific time before the start of the transmission so that the engine 106_X(X) can start providing the data on-time.

Additionally, some jobs to be processed by the engines 106_X(X) may need to begin at or before a specific time in order to be useful for the wireless protocol processing; consequently, when such a job is submitted for processing after the specific time, it may not be worthwhile to begin the job. By means of an example, consider a job decoding a request from a phone. The wireless protocol might require that the response to the phone request is sent a pre-determined time interval after the phone request is sent. If the request decoding cannot be processed within the pre-determined time interval or the pre-determined time interval has already passed, then it is not worthwhile to begin the job.

To provide current time to the engines 106_X(X), the programmable scheduler module 102 comprises a timer 102(14), which causes the broadcast of current time to all the engines 106_X(X). The timer 102(14) keeps track of radio frames and sub-frames and at the start of each sub-frame sends a time command directly to the job arbitrator and assignor 102(2), which is configured to give the time command priority over job commands provided by the command queues 102(4)_X. The time command is sent to the engines 106_X(X), which then synchronize the engines' 106_X(X) internal clocks (not shown). This allows the engines 106_X(X) to have knowledge of the current time, enabling mitigation of errors due to delays in the timer 102(14) broadcast and the tolerance of the internal clocks and self-terminating jobs that may have been submitted too late. Means to render effects of the errors insignificant comprising e.g., priority of the current time broadcasting, communication the broadcast delay in the broadcast, compensation of the internal clock, and other means known to a person or ordinary skill in the art may be implemented.

As disclosed supra, the engines 106_X(X) may comprise a plurality of digital signal processors and/or hardware accelerators and thus be capable of accepting a plurality of jobs at one time. Additionally, the engines 106_X(X) may further comprise a local job queue (not shown) of waiting jobs and/or a mechanism to support pipelined processing of multiple jobs simultaneously. Thus, the engines 106_X(X) might be able to accept m jobs waiting in the local queue and n pipeline jobs; consequently the scheduler 102 can schedule m+n simultaneous jobs. To optimize job processing when multiple engines 106_X(X) are capable of processing a job, it may be beneficial to submit the job to the least loaded engine to balance the workloads and memory traffic, thus improving the overall performance of the system 100.

To simplify hardware implementation of the system 100, at least one subset of the plurality of the engines 106_X(X) may be organized into and implemented in hardware as one or more physical clusters 106_X, sharing one or more resources, e.g., a common data path, i.e., bandwidth, memory, and other shared resource known to a person of ordinary skill in the art. The engines 106_X(X) not belonging to the at least one subset stand alone.

To properly manage load balancing due to a fixed nature of the structure of the physical cluster 106_X as well as due to the difference between the structure of the physical cluster 106_X and a stand-alone engine, the control software may assign any of the engines 106_X(X), regardless of their status of belonging to a physical cluster 106_X or stand alone, into one or more virtual clusters (not shown). Should any of the engines 106_X(X) remain un-assigned, such unassigned engines are treated as belonging to a single implicit virtual cluster. By means of an example, the control software may create a first virtual cluster comprising engines 106_2(2) and 106_2(4), a second virtual cluster comprising engines 106_4(2) and 106_4(4), and a third virtual cluster comprising engine 106_2(6) and 106_4(6). The unassigned engines 106_6(2), 106_6(4), 106_8(2), and 106_(4) belong to a fourth implicit virtual cluster. In the following, the term cluster is thus understood to refer collectively to either a physical cluster, a virtual cluster, or an implicit virtual cluster unless specified otherwise.

To submit the job to the least loaded resource, the load of a cluster is measured by a cluster credit and the load of an engine 106_X(X) is measured by an engine's credit. An engine credit is a representation of the number of jobs that a specific engine 106_X(X), can process simultaneously. The engine credits are tracked by the job arbitrator and assignor 102(2) that, upon job submission, decrements the credit of an engine 106_X(X) assigned to process the job, and upon the job completion increments the credit of an engine 106_X(X) reporting the job completion. Thus, the number of credits is inversely related to a load.

A cluster credit is a representation of the number of jobs that can be submitted to engines 106_X(X) of a cluster. The control software or the designer during implementation may designate one or more of the plurality of clusters and set cluster credits of the designated clusters to a pre-determined value, e.g., a value of zero, a value greater than the maximum number of credits for any of the plurality of non-designated clusters, or an arbitrary value between zero and the maximum. The arbitrator and assignor 102(2) tracks cluster credits of such designated clusters, and determines cluster credits of non-designated clusters by calculating a sum of credits of all the engines 106_X(X) comprising the non-designated cluster.

In one aspect, upon a job being ready to be submitted, with multiple engines 106_X(X) capable of servicing the job, the job arbitrator and assignor 102(2) first evaluates credits of all the engines 106_X(X) capable of processing the type of job. When a single engine 106_X(X) capable of processing the type of job has maximum credits, the job arbitrator and assignor 102(2) submits the job to the engine. When a plurality of engines 106_X(X) capable of processing the job have identical maximum credits, the job arbitrator and assignor 102(2) next evaluates credits of the clusters comprising the engines 106_X(X) with identical maximal credits and submits the job to the least loaded engine 106_X(X) and cluster. When even the clusters have identical maximum credits, the job arbitrator and assignor 102(2) submits the job according to a pre-determined policy. Such a pre-determined policy may comprise, e.g., random selection, selection of least recently used engine 106_X(X), the lowest numbered engine 106_X(X), and other policies known to a person of ordinary skill in the art.

In another aspect, upon a job being ready to be submitted, with multiple engines 106_X(X) capable of servicing the job, the job arbitrator and assignor 102(2) first evaluates credits of all clusters comprising engines 106_X(X) capable of processing the type of job. When one cluster has maximum credits, the job arbitrator and assignor 102(2) next evaluates credits of the engines 106_X(X) capable of processing the type of job of the one cluster and submits the job to the least loaded engine 106_X(X) capable of processing the type of job. When the engines 106_X(X) capable of processing the type of job have identical maximum credits, the job arbitrator and assignor 102(2) submits the job according to a pre-determined policy. When more than one cluster have maximum credits, the job arbitrator and assignor 102(2) again evaluates credits of the engines 106_X(X) capable of processing the type of job of the more than one cluster with maximum credits and submits the job to the least loaded engine 106_X(X) capable of processing the type of job. When the engines 106_X(X) capable of processing the type of job have identical maximum credits, the job arbitrator and assignor 102(2) submits the job according to a pre-determined policy. Such a pre-determined policy may comprise, e.g., random selection, selection of least recently used engine 106_X(X), the lowest numbered engine 106_X(X), and other policies known to a person of ordinary skill in the art.

The decision whether the job arbitrator and assignor 102(2) first evaluates the credits of all the engines 106_X(X) capable of processing the type of job or the credits of all clusters comprising engines 106_X(X) capable of processing the type of job is determined by a credit evaluation policy. In one aspect, the credit evaluation policy is determined by the control software in accordance with criteria established by a system designer. In another aspect, the credit evaluation policy may be determined by the system designer for a design targeting an expected use case(s).

As alluded to supra, using the organization of the engines 106_X(X) into physical clusters 106_X for load balancing may not be optimal; because load balancing in accordance with the former aspect, i.e., prioritizing load balancing across individual engines, might lead to imbalance between clusters, and load balancing in accordance with the latter aspect, prioritizing load balancing across individual clusters, might lead to imbalance between engines.

Figure 5A:
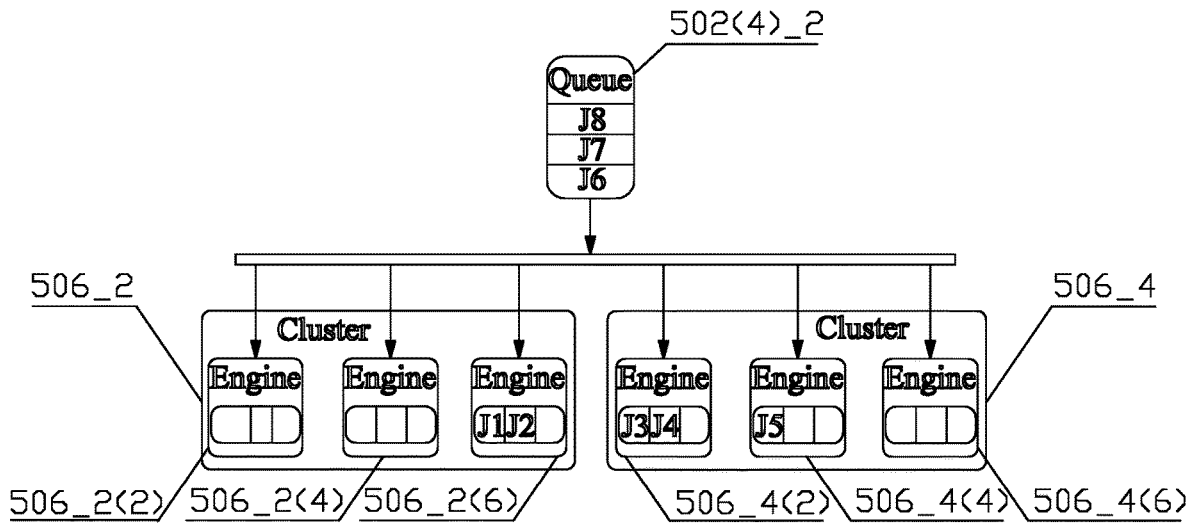
FIG. 5a. depicts an exemplary configuration demonstrating a load balancing inefficiency based on physical clusters.

By means of an example, depicted in FIG. 5a, consider the physical clusters 506_2 and 506_4, wherein each engine 506_2(2), 506_2(4), 506_2(6), 506_4(2), 506_4(4), and 506_4(6) is capable of processing three simultaneous jobs, and wherein engines 506_2(2), 506_2(4), 506_4(2), 506_4(4) are of first type, and engines 506_2(6) and 506_4(6) are of a second type. Additionally, consider that each engine 506_2(6) and 506_4(2) is processing two active jobs J1, J2 and J3, J4 respectively, engine 506_4(4) is processing one job J5, and engines 506_2(2), 506_2(4), and 506_4(6) are not processing any jobs. Thus, physical cluster 506_2 is processing two jobs and physical cluster 506_4 is processing three jobs.

Should the load balancing in accordance with the latter-disclosed aspect be used, and engines 506_2(6) and 506_4(6) are capable of processing the next scheduled job J6, the job arbitrator and assignor 502(2) first selects the physical cluster 506_2 that has more credits and submits the job to the engine 506_2(6) although the submission causes the engine 506_2(6) to process three jobs while the engine 506_4(6) is not processing any jobs.

Figure 5B:
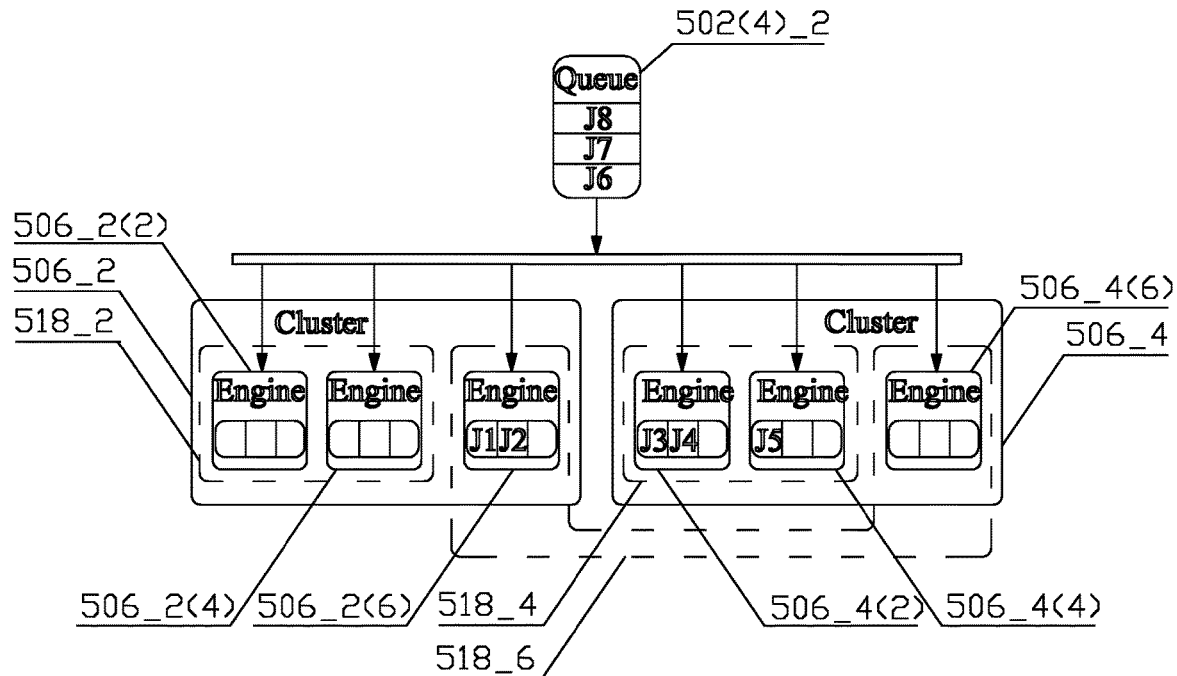
FIG. 5b. depicts an exemplary configuration demonstrating an improvement to the load balancing, by the use of virtual clusters.

To mitigate the uneven load balancing, the control software may arrange the engines 506_X(X) into virtual clusters 518_X as depicted in FIG. 5b. Thus, continuing with the example, a first virtual cluster 518_2 may comprise engines 506_2(2) and 506_2(4), a second virtual cluster 518_4 may comprise engines 506_4(2) and 506_4(4),and a third virtual cluster 518_6 may comprise engine 506_2(6) and 506_4(6). Thus, virtual cluster 518_2 is processing zero jobs, virtual cluster 518_4 is processing three jobs, and virtual cluster 518_6 is processing two jobs.

Should the load balancing in accordance with the latter-disclosed aspect be used, and engines 506_2(6) and 506_4(6) are capable of processing the next scheduled job J6, the job arbitrator and assignor 502(2) first selects the virtual cluster 518_6, as the only virtual cluster containing engines capable of processing the job J6. Within virtual cluster 518_6, the job arbitrator and assignor 502(2) determines which engine has more credits and submits the job to the engine 506_4(6).

A person of ordinary skill in the art will appreciate that the example is meant to illustrate potential problems with the different balancing aspects and is not to suggest that the virtual clusters are to comprise identical engines. The arrangement of the engines into virtual clusters for optimal load balancing depends on the number of engines capable of processing certain job type(s), on mapping jobs on engines capable of processing them, and desired quality of service for different job types. Therefore, different baseband protocols, as well as different designs of the integrated circuit comprising the structure 100 may have different number and require different arrangement of engines and/or physical clusters.

In addition to the load balancing optimization use of virtual clusters may provide implementation benefits. Enabling the control software to configure virtual clusters at run-time allows the same scheduler 102 to be reused across multiple different integrated circuit designs. Furthermore, the flexibility of having the control software definable virtual clusters means that the scheduler 102 can be developed and tested independently of the clustering layout, resulting in a shorter development period in many cases.

In addition to controlling job submission, the credit values provide a current assessment of workload of each engine 106_X(X) and cluster 106_X.

As exemplified in the disclosure of credits determination and comparison supra, there is a need to quickly compare values of variables and identify the variable with the highest values. As known to a person of ordinary skill in the art, the thermometer method encodes each of the variables' values to represent each variable's value as a one-hot vector. The term one-hot refers to a group of bits among which the legal combinations of values are only those with a single logical 1 bit and all the other values logical 0. An example of several variables, the variables' values, and the variables' values thermometer representation is depicted in the first three columns of FIG. 6. Performing a bitwise or (OR) operation on all the one-hot vectors and finding a value of logical 1 at the highest bit position in the result of the bitwise OR determines the highest value. Therefore, the one-hot vector(s) with a value of logical 1 at the bit position equal to the highest bit position of the result of the bitwise OR determines the variable(s) with the highest value(s).

A disadvantage of the thermometer method is that computational and memory requirements increase with increasing number of values of variables. By means of an example, for values in a range of 0-15, which can normally be represented in 4 bits, the thermometer encoding requires 15 bits per variable.

For comparison of variables with certain common distributions of values, for which a threshold W can be established so that only infrequently encountered values fall above the threshold W, a modified encoding according to the aspect of this disclosure may be used. The values of each of the variables x with values less than or equal to a pre-determined threshold W are encoded as one-hot vectors and the values of each of the variables x with values greater than the pre-determined threshold W are encoded as vectors by applying the bitwise OR operator to the one-hot encoding of the threshold W and an binary encoding of the variable. In one aspect, the modified encoding is described by the following equations:

$$\text{for } x==0: mt(x)=0 \qquad \text{Eq.(1)}$$

$$\text{for } x\in(0,W]: mt(x)=1<<(x-1) \qquad \text{Eq.(2)}$$

$$\text{for } x\in(W,N]: mt(x)=(1<<(W-1))\vee(x-W) \qquad \text{Eq.(3)}$$

wherein:
x is the value of a variable to be encoded:
mt is the encoding function;
<< is a bitwise left shift operator;
N is the highest value to be represented;
W is the threshold for the modified thermometer; and
$\vee$ is a bitwise OR operator The modified thermometer representation of the variables' values is depicted in the fourth column of FIG. 6. Considering Equations (1)-(3) it follows that the standard thermometer comparison of the encoded values via the bitwise OR operation produces accurate results for x≤W, since the values are encoded as one-hot vectors, while any higher values saturate at W, since the values are encoded as vectors by applying the bitwise OR operator to the one-hot encoding of the threshold W and a binary encoding of the variable. If necessary, accurate comparisons could be done on these higher values using standard unsigned integer logic on the binary encoding of the credits. Equations (1)-(3) further follows that a compromise between accuracy and encoding length may be controlled by a choice of W based on (in)frequency of the values greater than W.

Although credit comparison has been given as an example, it will be appreciated that the modified thermometer may be used in other instances, where quick comparison of values of variables and identification of the variable with the highest values is needed, e.g., replacement policy for a cache or translation look-aside buffer, a priority-based scheduler, data-mining applications when selecting a "longest-match", and other instances known to a person of ordinary skill in the art.

Several modes of controlling the command queues 102(4)_X to wait for specific events or conditions before proceeding were disclosed supra. Although the powerful control over the job processing flow results in efficiency, potential for programmer error, system malfunctions, or other unaccounted for conditions may result in deadlock conditions slowing or halting the processing flow.

To detect and handle these cases, a queue timeout method is provided; wherein each of the plurality of the command queues 102(4)_X comprises a programmable maximum allowed time between job submissions for arbitration. If a command queue 102(4)_X has a scheduled job in condition for processing for a time that exceeds the maximum allowed time, the affected command queue 102(4)_X generates an interrupt provided via the ready job filter 102(6) and the non-job command arbitrator 102(8) to the one or more cores 116(X) of a host 116.

The dependent job handling disclosed supra, has assumed that all jobs complete successfully, i.e., on time, and/or without errors. However, if a preceding job finishes unsuccessfully, there may be no need to submit the dependent job(s). Consequently, instead of submitting a dependent job and consuming resources needlessly, the dependent job could be conditionally submitted, wherein the conditions would indicate for the preceding job successful completion.

Upon job completion, the engine 106_X(X) processing the job reports to the response arbitrator 102(10) indicator(s) identifying the condition of completion. The response arbitrator 102(10) then enqueues the dependent job command(s) of the relevant service requestor 102(4)_X, or discards the dependent job command(s).

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the text disclosing steps of a method is not exhaustive in that because certain steps may be added or be unnecessary and/or may be carried out in parallel or a different order based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus for programmable job scheduling, comprising:
a hardware scheduler module comprising:
a plurality of queues, each of the plurality of queues having a plurality of entries, at least one of the plurality of queues comprising at least one enqueued command;
a ready job filter configured to determine a category of the commands at the head entry of each of the plurality of queues, wherein the category consists of job commands and non-job commands;
a non-job command arbitrator configured to process each determined non-job category command; and
a job arbitrator and assignor configured to
receive from the ready job filter a determination that at least one engine capable of processing at least one of the each determined job commands is available;
arbitrate among the at least one determined job commands; and
provide the job command selected by the arbitration to one of the at least one engine.

2. The apparatus as claimed in claim 1, further comprising: a timer configured to provide a command directly to the job arbitrator and assignor; and wherein the job arbitrator and assignor is further configured to process the provided command with a priority over the commands at the head entry of each of the plurality of queues.

3. The apparatus as claimed in claim 1, further comprising: a host configured to enqueue the at least one command to the at least one of the plurality of queues.

4. The apparatus as claimed in claim 1, further comprising: a response arbitrator; wherein at least one engine is configured to cause the response arbitrator to enqueue at least one command to the at least one of the plurality of queues.

5. The apparatus as claimed in claim 4, wherein the response arbitrator enqueues the at least one command by being configured to: receive the at least one command from the at least one engine; determine a category and a queue identifier for the at least one command; enqueue the at least one non-job category command identified by an immediate queue identifier into an immediate queue; and enqueue the at least one command identified by a command queue identifier into the identified command queue regardless of the determined category.

6. The apparatus as claimed in claim 4, wherein the response arbitrator enqueues the at least one command by being configured to: enqueue the at least one command comprising a job command for a subsequent job to one of the plurality of command queues upon successful completion of execution of a job command executing on the at least one engine; and discard the at least one command comprising a job command upon unsuccessful completion of execution of a job command executing on the at least one engine.

7. The apparatus as claimed in claim 1, wherein the ready job filter is further configured to: determine that the command comprises a WAIT command or a command with a wait condition parameter; stall the command queue comprising the WAIT command or the command with the wait condition parameter; unstall the command queue comprising the WAIT command or the command with the wait condition parameter when a status of a wait condition is reached; provide for arbitration a command subsequent to the WAIT command when the command queue comprises the WAIT command; and provide for arbitration the command with the wait condition parameter otherwise.

8. The apparatus as claimed in claim 7, wherein the wait condition is selected from a group consisting of reaching a specific count value by one of one or more counters; reaching a specific time value by a timer; completing all outstanding jobs from the command queue submitting the wait command or the command with the wait condition parameter; and receiving a wait clearing command.

9. The apparatus as claimed in claim 1, wherein the ready job filter is further configured to: determine in accordance with a content of a programmable vector corresponding to a job type defined by each determined job category command the at least one engine capable of processing the job type.

10. The apparatus as claimed in claim 9, wherein the host is further configured to: define the programmable vectors.

11. The apparatus as claimed in claim 1, wherein the host is further configured to: determine a number of queues; configure the apparatus with the plurality of queues equal to the determined number; and. configure a size of each of the number of queues.

12. The apparatus as claimed in claim 1, wherein each of the plurality of queues is further configured to: generate an interrupt for each of the plurality of queues for which the command at the head of said queue exceeded a maximum allowed time for submissions for arbitration.

13. The apparatus as claimed in claim 1, wherein the at least one enqueued command in at least one of the plurality of queues comprises: at least one job category command for each of a sequence of jobs; and the job arbitrator and assignor processes each determined job category command by being configured to: receive from the ready job filter determination that at least one engine is capable of processing all jobs from the sequence of jobs; reserve the at least one engine for processing the sequence of jobs; and release the reservation upon the at least one engine concluding processing of the last job of the sequence of jobs.

14. The apparatus as claimed in claim 1, wherein the non-job command arbitrator processes each determined non-job category command by being configured to select of one of disabling one of the plurality of queues; enabling one of the plurality of queues; and resetting one of the plurality of queues.

15. A method for programmable job scheduling, comprising: enqueueing at least one command into one of a plurality of queues each of the plurality of queues having a plurality of entries; determining a category of the command at the head entry of each of the plurality of queues; processing each determined non-job category command by a non-job command arbitrator; and processing each determined job category command by a job arbitrator and assignor comprising:
Determining whether at least one engine capable of processing at least one of the each determined job commands is available; and
when the determining is positive;
arbitrating among the at least one determined job commands; and
providing the job command selected by the arbitrating to one of the at least one engine.

16. The method as claimed in claim 15, further comprising: receiving a command from a timer directly at the job arbitrator and assignor; and processing the received command with a priority over the commands at the head entry of each of the plurality of queues.

17. The method as claimed in claim 15, wherein the enqueueing at least one command into one of a plurality of queues comprises: enqueueing the at least one command by a control software executed by a host.

18. The method as claimed in claim 15, wherein the enqueueing at least one command into one of a plurality of queues comprises: enqueueing the at least one command received from an engine.

19. The method as claimed in claim 18, wherein the enqueueing the at least one command received from an engine comprises: determining a category and a queue identifier for the at least one command; enqueueing the at least one non-job category command identified by an immediate queue identifier into an immediate queue; and enqueueing the at least one command identified by a command queue identifier into the identified command queue regardless of the determined category.

20. The method as claimed in claim 18, wherein the enqueueing the at least one command received from an engine comprises: enqueueing the at least one command comprising a job command for a subsequent job to one of the plurality of command queues upon successful completion of execution of a job command executing on the engine; and discarding the at least one command comprising a job command upon unsuccessful completion of execution of a job command executing on the engine.

21. The method as claimed in claim 15, wherein the processing each determined non-job category command by a non-job command arbitrator and processing each determined job category command by a job arbitrator and assignor comprises: determining that the determined command comprises a WAIT command or a command with a wait condition parameter; stalling the command queue submitting the WAIT command or the command with the wait condition parameter; unstalling the command queue comprising the WAIT command or the command with the wait condition parameter when a status of a wait condition is reached; providing for arbitration a command subsequent to the WAIT command when the command queue comprises the WAIT command; and providing for arbitration the command with the wait condition parameter otherwise.

22. The method as claimed in claim 21, wherein the wait condition is selected from a group consisting of reaching a specific count value by one of one of more counters; reaching a specific time value by a timer; completing all outstanding jobs from the command queue submitting the wait command or the command with the wait condition parameter; and receiving a wait clearing command.

23. The method as claimed in claim 15, further comprising: determining the at least one engine capable of processing the job type in accordance with a content of a programmable vector corresponding to a job type defined by each determined job category command.

24. The method as claimed in claim 23, further comprising: defining the programmable vectors by a control software executed by a host.

25. The method as claimed in claim 15, further comprising: determining a number of queues; configuring the plurality of queues to equal the determined number; and configuring a size of each of the plurality of queues.

26. The method as claimed in claim 15, further comprising: generating an interrupt for each of the plurality of queues for which the command at the head of said queue exceeded a maximum allowed time for submissions for arbitration.

27. The method as claimed in claim 15, wherein the enqueueing at least one command into one of a plurality of command queues comprises; enqueueing into one of the plurality of command queues at least one job category command for each of a sequence of jobs; and the processing each determined job category command by a job arbitrator and assignor comprises: determining at least one engine capable of processing all jobs from the sequence of jobs; reserving the at least one engine for processing the sequence of jobs; and releasing the reservation upon the at least one engine concluding processing of the last job of the sequence of jobs.

28. The method as claimed in claim 15, wherein the processing each determined non-job category command by a non-job command arbitrator consists of one of disabling one of the plurality of queues; enabling one of the plurality of queues; and resetting one of the plurality of queues.

\* \* \* \* \*